(12) United States Patent
Wray et al.

(10) Patent No.: US 8,826,751 B2
(45) Date of Patent: Sep. 9, 2014

(54) CIRCUMFERENTIAL SAMPLING TOOL

(75) Inventors: Richard Wray, Deep River (CA); Greg Hersak, Deep River (CA)

(73) Assignee: Atomic Energy of Canada Limited, Mississauga (CA)

( * ) Notice: Subject to any disclaimer, the term of this patent is extended or adjusted under 35 U.S.C. 154(b) by 382 days.

(21) Appl. No.: 13/380,341

(22) PCT Filed: May 21, 2010

(86) PCT No.: PCT/CA2010/000781
§ 371 (c)(1),
(2), (4) Date: Dec. 22, 2011

(87) PCT Pub. No.: WO2010/148479
PCT Pub. Date: Dec. 29, 2010

(65) Prior Publication Data
US 2012/0090412 A1  Apr. 19, 2012

Related U.S. Application Data

(60) Provisional application No. 61/219,655, filed on Jun. 23, 2009.

(51) Int. Cl.
*G01N 1/04* (2006.01)
*G21C 17/017* (2006.01)

(52) U.S. Cl.
CPC .................................. *G21C 17/017* (2013.01)
USPC ...................................................... 73/864.41

(58) Field of Classification Search
None
See application file for complete search history.

(56) References Cited

U.S. PATENT DOCUMENTS

| | | | |
|---|---|---|---|
| 4,715,751 A | 12/1987 | Rigoulot | |
| 4,925,621 A | 5/1990 | Muth et al. | |
| 4,955,951 A | 9/1990 | Nemoto et al. | |
| 5,408,883 A * | 4/1995 | Clark et al. | 73/601 |
| 5,675,096 A * | 10/1997 | Hydeman et al. | 73/864.41 |
| 5,869,775 A * | 2/1999 | Theroux et al. | 73/864.41 |
| 6,599,067 B2 | 7/2003 | Scott et al. | |

FOREIGN PATENT DOCUMENTS

| | | |
|---|---|---|
| CA | 2026414 | 3/1992 |
| CN | 2531379 Y | 1/2003 |

OTHER PUBLICATIONS

International Search Report dated Sep. 1, 2010 from PCT/CA2010/000781.
Written Opinion of the International Searching Authority dated Sep. 1, 2010 from PCT/CA2010/000781.

(Continued)

*Primary Examiner* — Robert R Raevis
(74) *Attorney, Agent, or Firm* — Norton Rose Fulbright Canada LLP

(57) ABSTRACT

A circumferential sampling tool for obtaining a sample from an interior wall of a tube has a cylindrical body with an aperture therein. First and second cutters are operatively connected to a shaft for rotation therewith. The first and second cutter are each movable radially between a retracted position and an extended position. First and second actuators are operatively connected to the first and second cutters respectively for moving the first and second cutters between their respective retracted and extended positions as the shaft rotates. Rotating the shaft causes the first cutter to move to the extended position thereby cutting a portion of the interior wall and then causes the second cutter to move to the extended position thereby cutting the sample from the interior wall from a location in the tube revealed by cutting the portion of the interior wall.

20 Claims, 9 Drawing Sheets

(56) References Cited

OTHER PUBLICATIONS

"Innovation in Pressure Tube Rolled Joint Sampling (Circumferential Sampling Tool Technology)": Guler B., King J.M., Wray R.: Seventh Annual International Conference on CANDU Maintenance: Nov. 20-22, 2005, Toronto. See the whole document.

Chinese Office Action, issued Feb. 28, 2013 on the corresponding Chinese Patent Application No. 201080033889.3, together with English translation.

Advanced Pressure Tube Sampling Tools by K. C. Wittich and J. M. King., May 9, 2014.

* cited by examiner

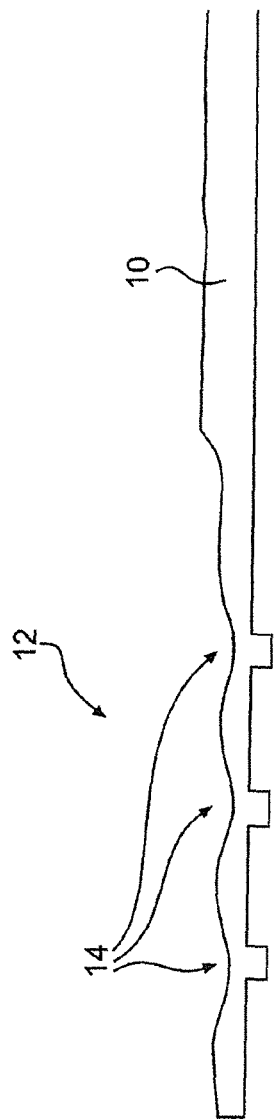

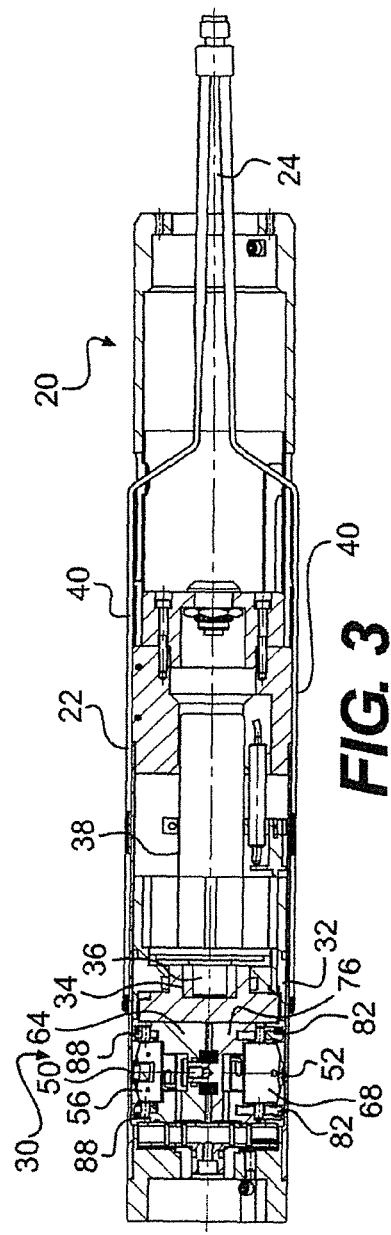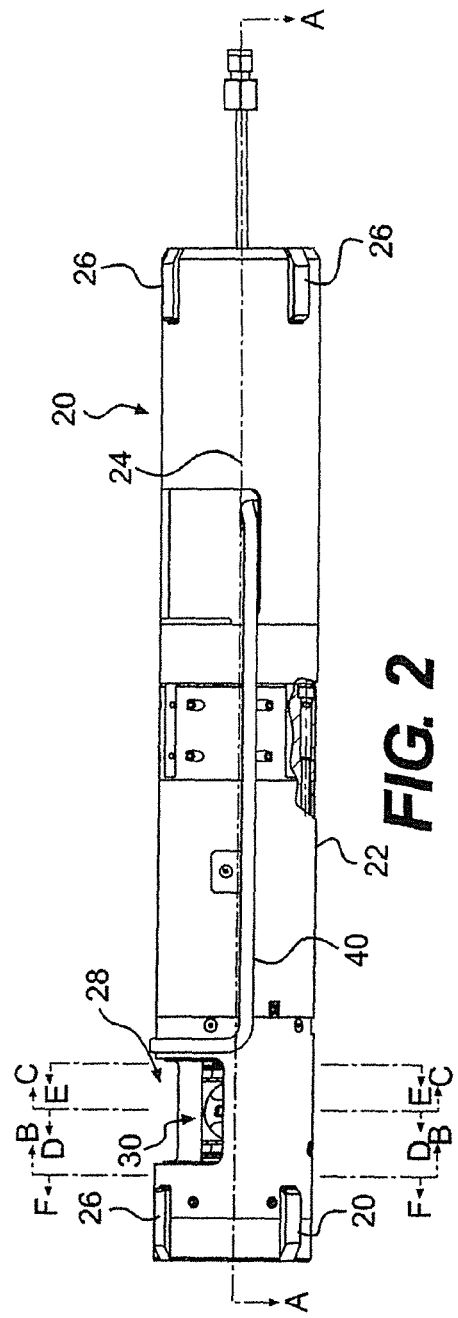

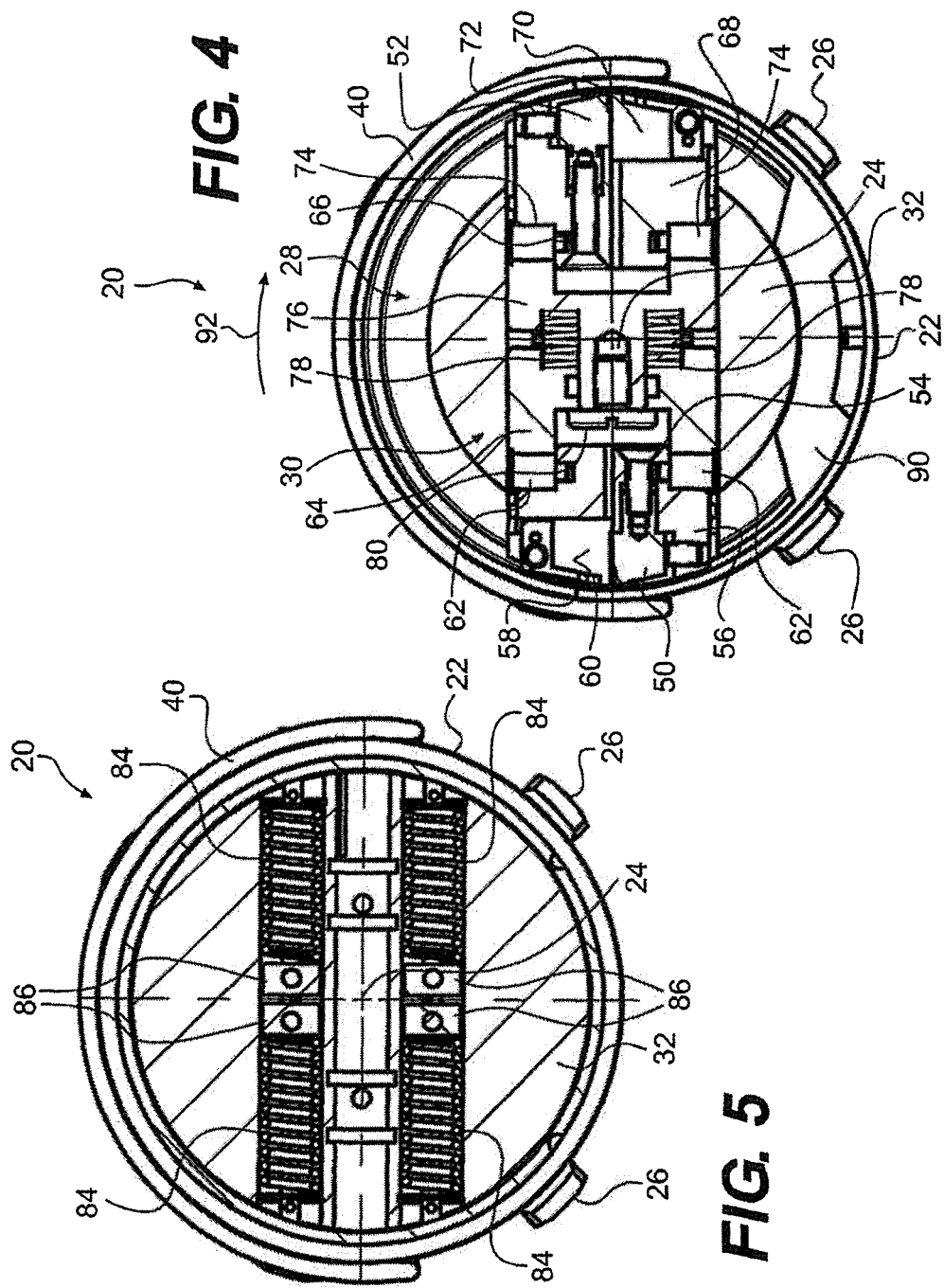

CIRCUMFERENTIAL SAMPLING TOOL

CROSS-REFERENCE

The present application claims priority to U.S. Provisional Application No. 61/219,655, filed Jun. 23, 2009, the entirety of which is incorporated herein by reference.

FIELD OF THE INVENTION

The present invention relates to a circumferential sampling tool.

BACKGROUND OF THE INVENTION

One method of assessing the useful life of pressure tubes in nuclear reactors, such as a CANDU reactor, requires the periodic removal of a tube. Samples are cut from the removed tube and analyzed for deuterium content. The deuterium concentration is then used as a measure of the useful life of the remaining pressure tubes. This approach is very costly because of the long shutdown period required to remove and replace a pressure tube.

Attempting to provide in-situ sampling (without pressure tube removal) presents numerous difficulties. Obtaining a useful sample is made difficult by the hard oxidized surface, and the need to obtain sample material from beneath the surface layer. To preserve the structural integrity of the tube and avoid detrimental residual stress, the sampling depth must be controlled and the sampled region must be left with smooth changes in geometry in all axes. Furthermore, the technique used for removing the surface material or sample must not involve excessive heating, as this affects the results of the subsequent analysis. Another difficulty is the recovery of the sample for analysis and preventing particles from being left in the pressure tube.

U.S. Pat. No. 4,925,621, issued May 15, 1990, the entirety of which is incorporated herein by reference, discloses a sampling tool useful for pressure tube sampling which addresses the above difficulties. The disclosed sampling tool permits in situ testing in that pressure tube removal is unnecessary. The sampling tool comprises two cutters and means for capturing the removed material. By moving both cutters axially in the pressure tube, one cutter removes the surface oxide layer, and the second cutter removes a sample for analysis. The cutters and cutting operation are designed to avoid damaging the integrity of the pressure tube to allow it to remain in service.

Although the above-described sampling tool addresses the above difficulties, it proves impractical to obtain samples in some portions of the pressure tube. For example, as seen in FIG. 1, in a CANDU type fuel channel, the pressure tube 10 is joined to an end fitting (not shown) using a rolled joint 12. The above-described sampling tool makes obtaining useful samples in the rolled joint area difficult due to the high axial gradient of hydrogen/deuterium concentration and the circumferential ripples 14 in the rolled joint area.

The conference paper presented at the 5$^{th}$ International CANDU Maintenance Conference in November 2000 which is entitled "Advanced Pressure Tube Sampling Tools" and is authored by K. Wittich and J. King also discloses sampling tools. The conference paper presented at the 7th International CANDU Maintenance Conference in November 2005 which is entitled "Innovation in Pressure Tube Rolled Joint Sampling (Circumferential Sampling Tool Technology)" and is authored by B. Guler, J. King, and R. Wray also discloses sampling tools. Both papers are published by the Canadian Nuclear Society.

Therefore, there is a need for a sampling tool that addresses at least some of the above-identified difficulties and at least some of the inconveniences present in the prior art.

SUMMARY OF THE INVENTION

It is an object of the present invention to provide a sampling tool that has at least two cutters that move circumferentially along a portion of an interior wall of a tube. One cutter removes a portion of the interior wall of the tube, and the second cutter removes a sample from the interior wall of the tube from a location in the tube revealed by removing the portion of the interior wall of the tube.

In one aspect, a circumferential sampling tool for obtaining a sample from an interior wall of a tube has a cylindrical body having a central axis, an aperture in the cylindrical body, and a shaft disposed in the cylindrical body along the central axis. A first cutter is operatively connected to the shaft for rotation therewith. The first cutter is movable radially between a retracted position where the first cutter is disposed inside the cylindrical body at a first distance from the central axis and an extended position where the first cutter extends at least in part through the aperture at a second distance from the central axis. The second distance is greater than the first distance. A first actuator is operatively connected to the first cutter for moving the first cutter between the retracted position and the extended position as the shaft rotates. The first actuator mechanically biases the first cutter toward the retracted position. A second cutter is operatively connected to the shaft for rotation therewith and is disposed at an angle to first cutter. The second cutter is movable radially between a retracted position where the second cutter is disposed inside the cylindrical body at a third distance from the central axis and an extended position where the second cutter extends at least in part through the aperture at a fourth distance from the central axis. The fourth distance is greater than the third distance. The fourth distance is greater than the second distance. A second actuator is operatively connected to the second cutter for moving the second cutter between the retracted position and the extended position as the shaft rotates. The second actuator mechanically biases the second cutter toward the retracted position. The second cutter is in the retracted position when the first cutter is in the extended position. The first cutter is in the retracted position when the second cutter is in the extended position. Rotating the shaft causes the first cutter to move to the extended position thereby cutting a portion of the interior wall of the tube and then causes the second cutter to move to the extended position thereby cutting the sample from the interior wall of the tube from a location in the tube revealed by cutting the portion of the interior wall of the tube.

In an additional aspect, the first actuator has a spring mechanically biasing the first cutter toward the retracted position. The second actuator has a spring mechanically biasing the second cutter toward the retracted position.

In a further aspect, a ramp is disposed inside the cylindrical body along a circumferential portion thereof. The ramp is disposed opposite the aperture. The first actuator also has a first roller. The first roller causes the first cutter to move to the extended position when the first roller rolls over the ramp. The second actuator also has a second roller. The second roller causes the second cutter to move to the extended position when the second roller rolls over the ramp.

In an additional aspect, a diameter of the first roller is greater than a diameter of the second roller.

In a further aspect, the first cutter is wider than the second cutter.

In an additional aspect, an arc defined by the first cutter in the extended position as the shaft rotates is longer than an arc defined by the second cutter in the extended position as the shaft rotates.

In a further aspect, a first receptacle is connected to the first cutter for receiving the portion of the interior wall of the tube cut by the first cutter, and a second receptacle is connected to the second cutter for receiving the sample cut by the second cutter.

In an additional aspect, at least one spring is connected to the first cutter for biasing the first cutter against the interior wall of the tube when the first cutter is in the extended position, and at least one spring is connected to the second cutter for biasing the second cutter against the interior wall of the tube when the second cutter is in the extended position.

In a further aspect, the first cutter is disposed opposite the second cutter.

In an additional aspect, at least one spring is connected between the first cutter and the second cutter. The at least one spring biases the first and second cutters away from each other.

In a further aspect, a motor is disposed in the cylindrical body and is operatively connected to the shaft for rotating the shaft.

In another aspect, a tool for obtaining a sample from an interior wall of a tube has a cylindrical body having a central axis, an aperture in the cylindrical body, a shaft disposed in the cylindrical body along the central axis, an extension ramp connected to the cylindrical body, and a retraction ramp connected to the cylindrical body. A first cutter is operatively connected to the shaft for rotation therewith. The first cutter is movable radially between a retracted position where the first cutter is disposed inside the cylindrical body at a first distance from the central axis and an extended position where the first cutter extends at least in part through the aperture at a second distance from the central axis. The second distance is greater than the first distance. A first actuator is operatively connected to the first cutter for moving the first cutter between the retracted position and the extended position by interacting with the retraction ramp and the extension ramp respectively as the shaft rotates. A second cutter is operatively connected to the shaft for rotation therewith and is disposed at an angle to first cutter. The second cutter is movable radially between a retracted position where the second cutter is disposed inside the cylindrical body at a third distance from the central axis and an extended position where the second cutter extends at least in part through the aperture at a fourth distance from the central axis. The fourth distance is greater than the third distance. The fourth distance is greater than the second distance. A second actuator is operatively connected to the second cutter for moving the second cutter between the retracted position and the extended position by interacting with the retraction ramp and the extension ramp respectively as the shaft rotates. The second cutter is in the retracted position when the first cutter is in the extended position. The first cutter is in the retracted position when the second cutter is in the extended position. Rotating the shaft causes the first cutter to move to the extended position thereby cutting a portion of the interior wall of the tube and then causes the second cutter to move to the extended position thereby cutting the sample from the interior wall of the tube from a location in the tube revealed by cutting the portion of the interior wall of the tube.

In an additional aspect, the first actuator includes a first actuation bar disposed generally parallel to the central axis. The first actuation bar has a first roller at a first end thereof, a second roller at a second end thereof, and at least one third roller between the first and second ends thereof. The second actuator includes a second actuation bar disposed generally parallel to the central axis. The second actuation bar has a fourth roller at a first end thereof, a fifth roller at a second end thereof, and at least one sixth roller between the first and second ends thereof. The extension ramp extends generally parallel to the central axis toward the first cutter and the second cutter, and defines an arc about the central axis. The retraction ramp extends generally parallel to the central axis toward the extension ramp, the first cutter and the second cutter, and defines an arc about the central axis. The first and second cutters are disposed between the extension ramp and the retraction ramp in a direction parallel to the central axis. A first holder is connected to the first cutter. The first holder has at least one slot defined therein at an angle to the central axis. The at least one slot of the first holder receives the at least one third roller therein. A second holder is connected to the second cutter. The second holder has at least one slot defined therein at an angle to the central axis. The at least one slot of the second holder receives the at least one sixth roller therein. When the first roller rolls over the extension ramp, the at least one third roller moves in the at least one slot of the first holder causing the first holder to move radially away from the central axis thereby causing the first cutter to move to the extended position. When the second roller rolls over the retraction ramp, the at least one third roller moves in the at least one slot of the first holder causing the first holder to move radially toward the central axis thereby causing the first cutter to move to the retracted position. When the fourth roller rolls over the extension ramp, the at least one sixth roller moves in the at least one slot of the second holder causing the second holder to move radially away from the central axis thereby causing the second cutter to move to the extended position. When the fifth roller rolls over the retraction ramp, the at least one sixth roller moves in the at least one slot of the second holder causing the second holder to move radially toward the central axis thereby causing the second cutter to move to the retracted position.

In a further aspect, the extension ramp has a first ramp portion and a second ramp portion. The first ramp portion is longer than the second ramp portion. The first roller rolls over the first ramp portion of the extension ramp and the fourth roller rolls over the second ramp portion of the extension ramp.

In an additional aspect, the retraction ramp has a first ramp portion and a second ramp portion. The first ramp portion is longer than the second ramp portion. The second roller rolls over the second ramp portion of the retraction ramp and the fifth roller rolls over the first ramp portion of the retraction ramp.

In a further aspect, the first cutter is wider than the second cutter.

In an additional aspect, an arc defined by the first cutter in the extended position as the shaft rotates is longer than an arc defined by the second cutter in the extended position as the shaft rotates.

In a further aspect, a first receptacle is connected to the first cutter for receiving the portion of the interior wall of the tube cut by the first cutter, and a second receptacle connected to the second cutter for receiving the sample cut by the second cutter.

In an additional aspect, at least one spring is connected to the first cutter for biasing the first cutter against the interior wall of the tube when the first cutter is in the extended position, and at least one second spring is connected to the second cutter for biasing the second cutter against the interior wall of the tube when the second cutter is in the extended position.

In a further aspect, a motor is disposed in the cylindrical body and is operatively connected to the shaft for rotating the shaft.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 1 is a cross-section of a portion of a pressure tube showing the rolled joint area;

FIG. 2 is a side elevation view of a circumferential sampling tool;

FIG. 3 is a cross-sectional view of the circumferential sampling tool of FIG. 2 taken through line A-A of FIG. 2;

FIG. 4 is a cross-sectional view of the circumferential sampling tool of FIG. 2 taken through line C-C of FIG. 2;

FIG. 5 is a cross-sectional view of the circumferential sampling tool of FIG. 2 taken through line B-B of FIG. 2;

DETAILED DESCRIPTION OF THE PREFERRED EMBODIMENTS

Figure 6:
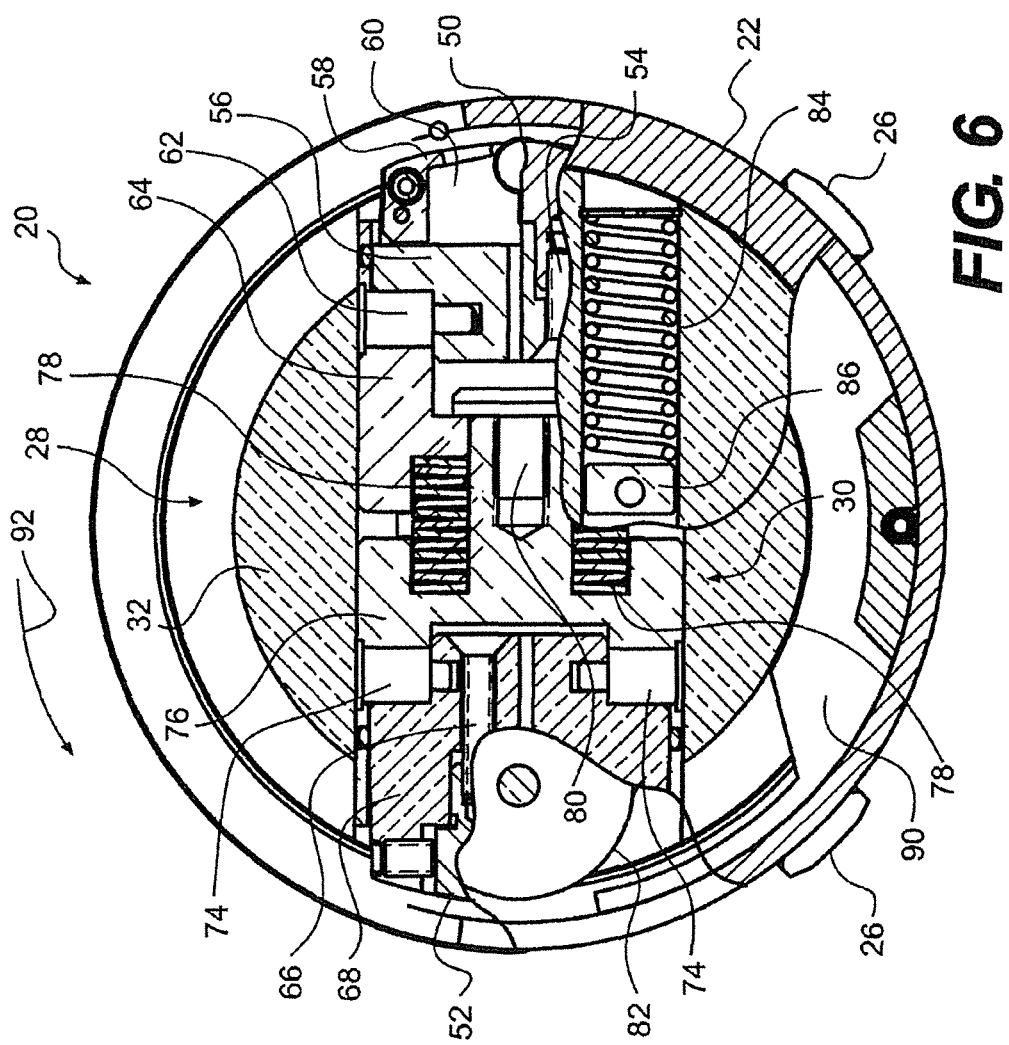
FIG. 6 is a cross-sectional view of the circumferential sampling tool of FIG. 2, a majority of which is taken through line D-D of FIG. 2, and portions of which are taken through line E-E and F-F of FIG. 2.

The circumferential sampling tool of the present invention will be described as being used for obtaining samples from pressure tubes of nuclear reactors to be analyzed for deuterium content. However it should be understood that the circumferential sampling tool could be used to collect other types of samples from other types of tubes or arcuate surfaces.

Turning to FIGS. 2 and 3, an embodiment of a circumferential sampling tool 20 will be described. The tool 20 has a cylindrical body 22 having a central axis 24. The cylindrical body 22 has a plurality of bearing pads 26 for supporting the tool 20 when the tool 20 is disposed inside the pressure tube. An aperture 28 is defined in the cylindrical body 20. A cutter assembly 30, described in greater detail below, is disposed inside the cylindrical body 20 in longitudinal alignment with the aperture 28. The cutter assembly 30 is held by a carriage 32. The carriage 32 is connected via a coupler 34 to an output shaft 36 of an electric motor 38. The electric motor 38 is used to rotate the cutter assembly 30 as will be described in greater detail below. The electric motor 38 is preferably a DC motor, however other types of motors are contemplated. It is contemplated that the motor 38 could be coupled to the cutter assembly 30 differently. For example, the output shaft 36 of the motor 38 could be connected to a driveshaft which in turn is connected to the carriage 32. A purge tube 40 is connected to the cylindrical body 22. The purge tube 40 is used to dry the surface of a pressure tube where a sample is to be collected as described below.

The circumferential sampling tool 20 is part of a circumferential sampling system, some of the features of which will be described briefly. The tool 20 is connected to a positioning system which permits accurate axial and angular positioning of the tool 20 in the pressure tube. A shielding sleeve is disposed over the tool 20 when the tool 20 is not pushed inside a pressure tube, thus closing the aperture 28. The tool 20, the positioning system, and the shielding sleeve are disposed on a support cart, which is preferably wheeled to facilitate the position of the cart.

To obtain a sample from the interior wall of a pressure tube (including a rolled joint region), the cart is first rolled in position adjacent an opened end of the emptied tube. The opened end of the tube has an end fitting disposed thereon. The shielding sleeve is then connected to the end fitting. The positioning system is used to set the angular and axial position where the sample is to be collected inside the tube. As will be understood from the description of the cutter assembly 30 provided below, the cutter assembly 30 uses gravity to collect the sample, and therefore the sample is normally collected from the upper half of the tube (i.e. between the 9 o'clock and 3 o'clock positions). The tool 20 is then pushed inside the tube such that the cutter assembly 30 is past the location where the sample is to be collected. An air purge operation is then performed using the purge tube 40 to dry the location where the sample is to be collected. The tool 20 is then moved back inside the tube such that the cutter assembly 30 is aligned with the location where the sample is to be collected. The tool 20 is locked in this position and the bearing pads 26 are actuated to maintain the tool 20 in position by pushing against the interior wall of the tube. The motor 38 is then actuated, thus causing the cutter assembly 30 to rotate about the central axis 24. As it rotates, the cutter assembly cuts a portion of the interior wall of the tube in a circumferential direction thereof, thus obtaining the sample. Additional details regarding this step will be provided below when describing the cutter assembly 30. The tool 20 is then unlocked, the bearing pads 26 released, and the tool 20 retracted back inside the shielding sleeve. The sample contained in the cutter assembly 30 is then transferred to a flask contained in the cart. The above steps (starting with the setting of the angular and axial position where the sample is to be collected) can be repeated for obtaining other samples in other locations in the tube. Once all samples have been collected, the shielding sleeve is disconnected from the end fitting and the cart is rolled away from the pressure tube. Finally, the flask(s) containing the sample(s) is (are) retrieved. The above steps relate to one possible method of delivering the tool 20 inside a pressure tube to obtain samples. It should be understood that other methods of delivering the tool 20 are possible and contemplated.

Turning now to FIGS. 3 to 6, the cutter assembly 30 will be described. The cutter assembly includes an oxide cutter 50 and a sample cutter 52 disposed opposite to each other. It is contemplated that the oxide cutter 50 and the sample cutter 52 could be disposed at other angles to each other. For example, it is contemplated that the oxide cutter 50 and the sample cutter 52 could be disposed perpendicularly to each other. The oxide cutter 50 and the sample cutter 52 are preferably made of carbide. The oxide cutter 50 is wider than the sample cutter 52 for reasons explained further below.

The oxide cutter 50 is connected by a threaded fastener 54 to an oxide cutter cartridge 56. A chip clip 58 is connected to the oxide cutter cartridge 56. The chip clip 58 retains the portion of the tube being cut by the oxide cutter 50 inside a receptacle 60 formed between the oxide cutter 50, the oxide cutter cartridge 56, and the chip clip 58, as will be explained below. The oxide cutter cartridge 56 is connected by a bayonnet-type mount 62 to an oxide cartridge holder 64.

Similarly, the sample cutter 52 is connected by a threaded fastener 66 to a sample cutter cartridge 68. A chip clip 70 is connected to the sample cutter cartridge 68. The chip clip 70 retains the sample being cut by the sample cutter 52 inside a receptacle 72 formed between the sample cutter 52, the sample cutter cartridge 68, and the chip clip 70, as will be explained below. The sample cutter cartridge 68 is connected by a bayonnet-type mount 74 to a sample cartridge holder 76.

Two stacks of Belleville springs 78 are disposed between the oxide cartridge holder 64 and the sample cartridge holder 76, thus biasing the two cutters 50, 52 away from each other. A threaded fastener 80 is inserted in the sample cartridge holder 76 and abuts the oxide cartridge holder 64, thus retaining the springs 78 between the two holders 64 and 76. It is contemplated that other types of springs could be used instead of the Belleville springs 78.

As will be described below, the cutters 50 and 52 are each movable (with the rest of the cutter assembly 30) between a retracted position where they are disposed inside the cylindrical body 22 and an extended position where they extend in part through the aperture 28 to cut the interior wall of the tube. The actuator for the oxide cutter 50 consists of two rollers 82 connected to either side of the sample cutter cartridge 68 (see FIG. 3) and of four springs 84. The rollers 82 are used to move the oxide cutter 50 to its extended position as will be described below. Two of the springs 84 are connected to the oxide cartridge holder 64 via two spring caps 86 and two of the springs 84 are connected to the sample cartridge holder 76 via two spring caps 86 (see FIG. 5). The springs 84 bias the oxide cutter 50 toward its retracted position. The actuator for the sample cutter 52 consists of two rollers 88 connected to either side of the oxide cutter cartridge 56 (see FIG. 3) and of the four springs 84. The rollers 88 are used to move the sample cutter 52 to its extended position as will be described below. The springs 84 bias the sample cutter 52 toward its retracted position. As can be seen in FIG. 3, the diameter of the rollers 82 is greater than the diameter of the rollers 88 for reasons discussed below. It is contemplated that the oxide and sample cutters 50, 52 could be actuated by other types of actuators. For example, it is contemplated that the rollers 82, 88 could be replaced by fixed cams.

As best seen in FIG. 6, a ramp 90 is disposed inside the cylindrical body 22 along a circumferential portion thereof. As can be seen, the ramp 90 is disposed opposite the aperture 28. As discussed below, the roller 82, 88 roll over the ramp 90 to move the cutters 50, 52 to their extended positions.

The method by which the cutter assembly 30 cuts the sample to be analyzed from the interior wall of the tube will now be described. The motor 38 turns the carriage 32 in the direction indicated by the arrow 92 in FIGS. 4 and 6, thus turning the cutter assembly 30 in the same direction. When the rollers 82 roll over the ramp 90, the cutter assembly 30 moves upwardly, thus moving the oxide cutter 50 to its extended position through the aperture 28. As the rollers 82 roll over the ramp 90, the oxide cutter 50 moves in an arc along a circumference of the interior wall of the tube and cuts an oxide layer from the interior wall of the tube. In a preferred embodiment, the oxide cutter 50 cuts slightly deeper than the oxide layer to ensure complete removal of oxide. The chip clip 58 causes the chip of oxide layer to curl inside the receptacle 60 as it is being cut. The Belleville springs 78 bias the oxide cutter 50 against the surface of the tube thus providing a cutting force, permitting the cutter to maintain contact with the surface should the surface be uneven and allowing the tool 20 to be used in a variety of pressure tube diameters. When the rollers 82 pass the ramp 90, the springs 84 bias the cutter assembly 30 back toward the inner wall of the cylindrical body 22, and therefore the oxide cutter 50 back to its retracted position. Once the oxide cutter 50 no longer contacts the interior wall of the tube, the chip of oxide layer falls inside the receptacle 60.

The cutter assembly 30 then continues to rotate. When the rollers 88 roll over the ramp 90, the cutter assembly 30 moves upwardly, thus moving the sample cutter 52 to its extended position through the aperture 28. As the rollers 88 roll over the ramp 90, the sample cutter 52 moves in an arc along a circumference of the interior wall of the tube and cuts a sample from the interior wall of the tube from the location in the tube where the oxide layer was cut. The chip clip 70 causes the sample chip to curl inside the receptacle 72 as it is being cut. The Belleville springs 78 bias the sample cutter 52 against the surface of the tube thus providing a cutting force, permitting the cutter to maintain contact with the surface should the surface be uneven and allowing the tool 20 to be used in a variety of pressure tube diameters. When the rollers 88 pass the ramp 90, the springs 84 bias the cutter assembly 30 back toward the inner wall of the cylindrical body 22, and therefore the sample cutter 52 back to its retracted position. Once the sample cutter 52 no longer contacts the interior wall of the tube, the sample chip falls inside the receptacle 72.

Figure 7:
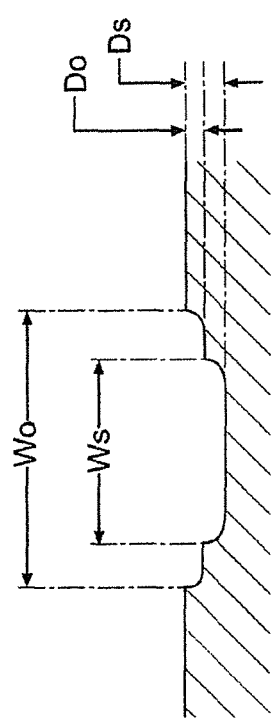
FIG. 7 is a cross-sectional view of a portion of a pressure tube where a sample has been obtained using the circumferential sampling tool of FIG. 2.

The sample cutter 52, when in the position shown in FIGS. 4 and 6, is disposed further from the central axis 24 than the oxide cutter 50, thus resulting in the sample cutter 52 cutting deeper than the oxide cutter 50. Therefore, as can be seen in FIG. 7, the depth Ds of the cut made by the sample cutter 52 is greater than the depth Do of the cut made by the oxide cutter 50. Also, as previously mentioned, the sample cutter 52 is narrower than the oxide cutter. Therefore, as can also be seen in FIG. 7, the width Ws of the cut made by the sample cutter 52 is smaller than the width Wo of the cut made by the oxide cutter 50. Since the rollers 88 have a smaller diameter than the rollers 82, the arc defined by the sample cutter 52 as it moves against the surface of the interior wall of the tube is shorter than the arc defined by the oxide cutter 50 as it moves against the surface of the interior wall of the tube. Therefore the sample chip is shorter than the oxide layer chip. The deeper, narrower, and shorter cut made by the sample cutter 52 ensures that the sample is free of oxide thus ensuring a reliable analysis of the deuterium concentration of the sample which can be used to determine the useful life of the pressure tube. Also, since the cutters 50, 52 move about the circumference of the interior wall of the tube, they are not affected by surface variations in the axial direction of the tube. Therefore, the tool 20 can be used to obtain samples in the rolled joint region of the pressure tube.

Figure 8:
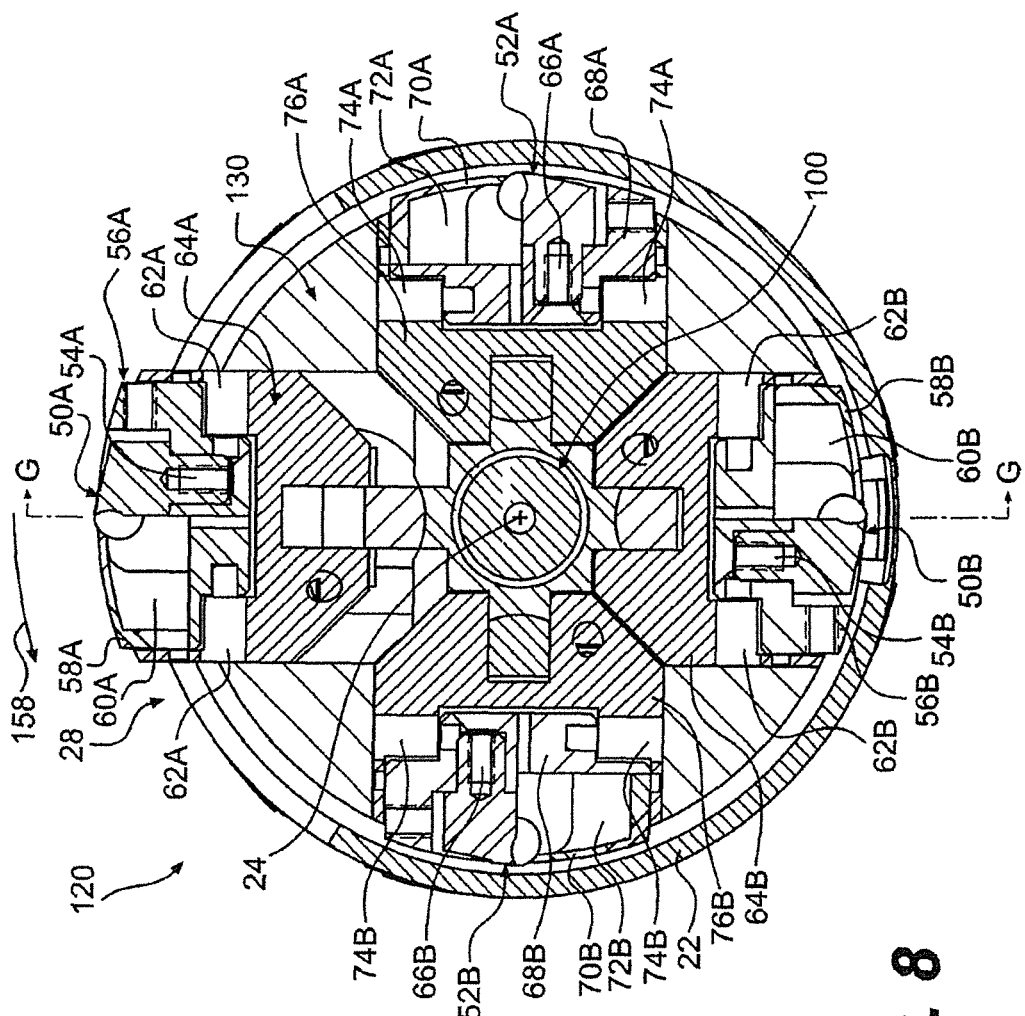
FIG. 8 is a cross-sectional view of an alternative embodiment of a circumferential sampling tool.

Turning now to FIGS. 8 to 11, an alternative embodiment of the circumferential sampling tool 20 (circumferential sampling tool 120) will be described. For simplicity, features of the tool 120 which are similar to those of the tool 20 have been labelled with the same reference numerals and will not be described again in detail The tool 120 is provided with a cutter assembly 130. The cutter assembly 130 is rotated by a driveshaft 100 connected to the motor 38 (not shown in this embodiment). As can be seen in FIG. 8, the cutter assembly 130 has two oxide cutters 50A, 50B and two sample cutter 52A, 52B. The two oxide cutters 50A, 50B are disposed opposite to each other. Similarly the two sample cutters 52A, 52B are disposed opposite to each other. The sample cutters 52A, 52B are disposed perpendicularly to the oxide cutters 50A, 50B. Each of the cutters 50A, 50B, 52A, and 52B is connected to a corresponding cutter cartridge and a cartridge holder and has a corresponding chip clip, receptacle, and fasteners as in the cutter assembly 30. Therefore, for simplicity, these elements have been labelled with the same reference numerals as in the cutter assembly 30 with the addition of the corresponding suffix A or B, as the case may be, and will not be described again in detail.

Each of the cutters 50A, 50B, 52A, and 52B is movable radially between a retracted position where it is disposed inside the cylindrical body 22 and an extended position where it extends in part through the aperture 28 to cut the interior wall of the tube. In a preferred embodiment, the distance between the oxide cutter 50A and the central axis 24 in its retracted and extended positions corresponds to the distance between the oxide cutter 50B and the central axis 24 in its retracted and extended positions, and the distance between the sample cutter 52A and the central axis 24 in its retracted and extended positions corresponds to the distance between the sample cutter 52B and the central axis 24 in its retracted and extended positions. In FIG. 8, the cutters 50B, 52A, and 52B are in their respective retracted position and the cutter 50A is in its extended position. Each of the cutters 50A, 50B, 52A, and 52B is provided with an actuator to move it between the two positions as the cutter assembly rotates. Except as otherwise indicated, the actuators for each of the cutters 50A, 50B, 52A, and 52B are the same and actuate the cutters 50A, 50B, 52A, and 52B in the same way. Therefore only the actuator of the oxide cutter 50A will be described in detail.

Figure 9:
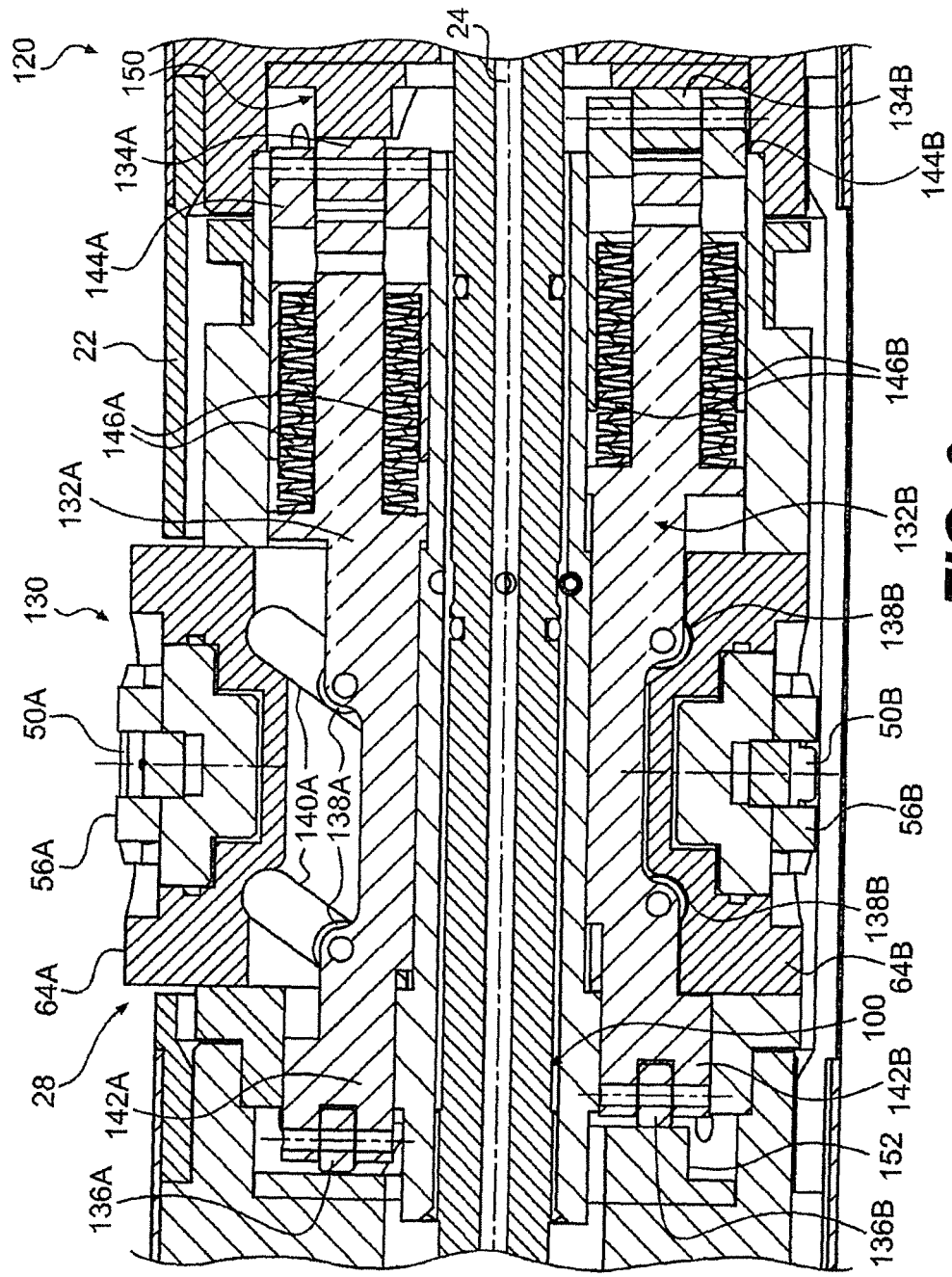
FIG. 9 is a cross-sectional view of the circumferential sampling tool of FIG. 8 taken through line G-G of FIG. 8.

As seen in FIG. 9, the actuator of the oxide cutter 50A includes an actuation bar 132A disposed generally parallel to the central axis 24. The actuation bar 132A has a roller 134A at a first end thereof, a roller 136A at a second end thereof, and two rollers 138A between the two ends thereof. As can be seen, the roller 134A is wider than the roller 136A, for reasons explained below. In the actuator for the sample cutters 52A and 52B, the relative roller width of the end rollers is the opposite (i.e. the roller corresponding to the roller 134A is narrower than the roller corresponding to the roller 136A), for reasons explained below. The two rollers 138A are received in two slots 140A formed in the lower portion of the oxide cartridge holder 64A. As can be seen, the two slots are disposed at an angle to the central axis 24. The actuation bar 132A is made in two parts 142A and 144A. The part 142A is received inside the part 144A and can move axially relative to the part 144A. Stacks of Belleville springs 146A bias the two parts 142A, 144A away from each other.

Figure 10:
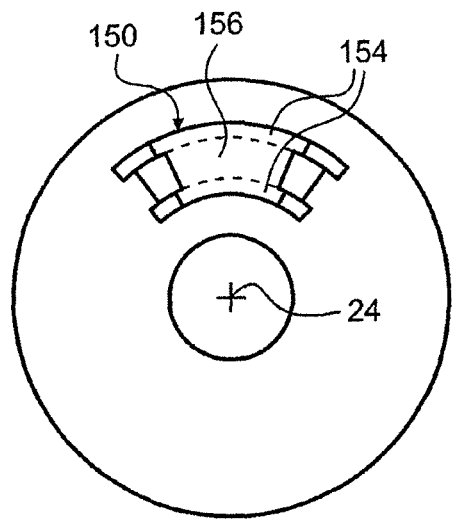
FIG. 10 is an end view of an extension ramp of the circumferential sampling tool of FIG. 8.

An extension ramp 150 is disposed inside of and is connected to the upper portion of the cylindrical body 22. As can be seen in FIG. 10, the extension ramp 150 defines an arc about the central axis 24. The extension ramp 150 extends generally parallel to the central axis 24 toward the cutter assembly 130. As discussed below, the roller 134A rolls over the extension ramp 150 to move the oxide cutter 50A to its extended position.

Figure 12:
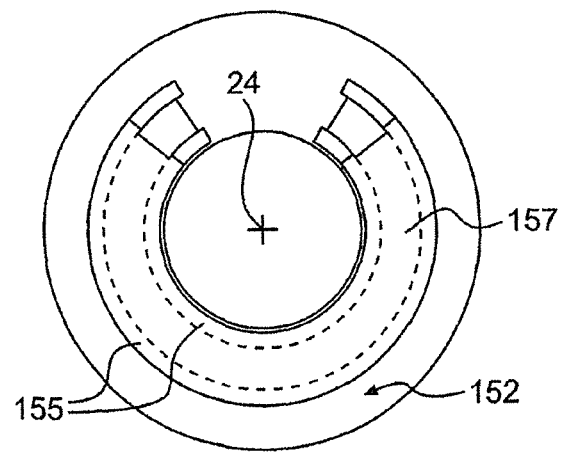
FIG. 12 is an end view of a retraction ramp of the circumferential sampling tool of FIG. 8.

A retraction ramp 152 is disposed inside of and is connected to the lower portion of the cylindrical body 22. As can be seen in FIG. 12, the retraction ramp 152 defines an arc about the central axis 24. The retraction ramp 152 extends generally parallel to the central axis 24 toward the cutter assembly 130 and the extension ramp 150. As discussed below, the roller 136A rolls over the retraction ramp 152 to move the oxide cutter 50A to its extended position.

Figure 11:
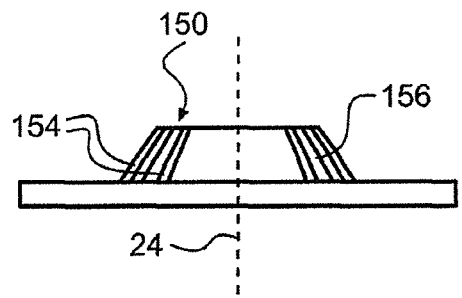
FIG. 11 is a side view of the extension ramp of FIG. 10.

As can be seen in FIGS. 10 and 11, the extension ramp 150 has long ramp portions 154 and a short ramp portion 156. The wide rollers 134A, 134B of the actuators of the oxide cutters 50A, 50B roll over the long ramp portions 154. The corresponding rollers of the actuators of the sample cutters 52A, 52B, which are narrow, roll over the short ramp portion 156.

Figure 13:
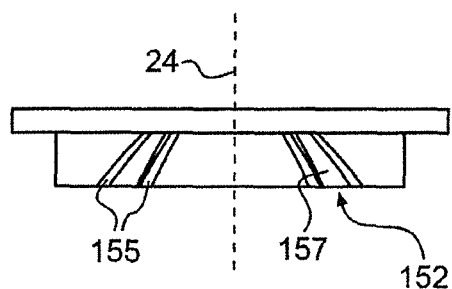
FIG. 13 is a side view of the retraction ramp of FIG. 12.

As can be seen in FIGS. 12 and 13, the retraction ramp 152 is longer than the extension ramp 150, and similarly has long ramp portions 155 and a short ramp portion 157. The narrow rollers 136A, 136B of the actuators of the oxide cutters 50A, 50B roll over the short ramp portion 157 of the retraction ramp 152. The corresponding rollers of the actuators of the sample cutters 52A, 52B, which are wide, roll over the long ramp portions 155 of the retraction ramp 152.

As the motor 38 turns the cutter assembly 130 in the direction indicated by arrow 158 in FIG. 8, the roller 134A rolls over the long portions 154 of the extension ramp 150. This causes the actuation bar 132A to move axially towards the left in FIG. 9. As the actuation bar 132A moves left (as seen in FIG. 9), the rollers 138A push against the slot 140A, which, due to their angle relative to the central axis, cause the oxide cartridge holder 64A to move upwardly. Therefore, the oxide cutter 50A moves to its extended position through the aperture 28. As the roller 134A rolls over the ramp 150, the oxide cutter 50A moves in an arc along a circumference of the interior wall of the tube and cuts an oxide layer from the interior wall of the tube. In a preferred embodiment, the oxide cutter 50A cuts slightly deeper than the oxide layer to ensure complete removal of oxide. The chip clip 58A causes the chip of oxide layer to curl inside the receptacle 60A as it is being cut. The Belleville springs 146A bias the oxide cutter 50A against the surface of the tube thus providing a cutting force, permitting the cutter to maintain contact with the surface should the surface be uneven and allowing the tool 120 to be used in a variety of pressure tube diameters. As the motor 38 continues to rotate, the roller 136A rolls over the short portion 157 of the retraction ramp as the roller 134A rolls off the extension ramp 150A. This causes the actuation bar 132A to move axially towards the right in FIG. 9. As the actuation bar 132A moves right (as seen in FIG. 9), the rollers 138A push against the slot 140A, which, due to their angle relative to the central axis 24, cause the oxide cartridge holder 64A to move downwardly. Therefore, the oxide cutter 50A moves to its retracted position. Once the oxide cutter 50A no longer contacts the interior wall of the tube, the chip of oxide layer falls inside the receptacle 60A.

As the motor 38 continues to rotate, the actuator of the sample cutter 52A moves the sample cutter 52A between its extended and retracted position in a similar manner. However, since the roller of this actuator rolls over the short portion 156 of the extension ramp 150, the arc defined by the sample cutter 52A as it moves against the surface of the interior wall of the tube is shorter than the arc defined by the oxide cutter 50A as it moves against the surface of the interior wall of the tube. Therefore the sample chip is shorter than the oxide layer chip. As in the cutter assembly 30, the sample cutter 52A also makes a narrower and deeper cut than the oxide cutter 50A. This is achieved by providing shims (not shown) between the sample cutter 52A and the sample cutter cartridge 68A. The deeper, narrower, and shorter cut made by the sample cutter 50A ensures that the sample is free of oxide thus ensuring a reliable analysis of the deuterium concentration of the sample which can be used to determine the useful life of the pressure tube.

Once the sample has been cut by the sample cutter 52A and the sample cutter 52A has been returned to its retracted position, the motor 38 is stopped. The tool 120 is then repositioned in the pressure tube in order to obtain a second sample from a different location. Once the tool 120 is repositioned, the motor 38 is turned on so as to continue to rotate the cutter assembly 130 which causes the oxide cutter 50B to cut another oxide chip and the sample cutter 52B to cut another sample in the same manner as the one described above with respect to cutters 50A and 52A. Therefore, the tool 120 advantageously allows two samples to be cut before the tool 120 has to be retracted back inside the shielding sleeve to transfer the samples to flasks contained in the cart, whereas this step needs to be done after each sample is cut with the tool 20.

Since the cutters 50A, 50B, 52A, and 52B move about the circumference of the interior wall of the tube, they are not affected by surface variations in the axial direction of the tube. Therefore, the tool 120 can be used to obtain samples in the rolled joint region of the pressure tube.

Modifications and improvements to the above-described embodiments of the present invention may become apparent to those skilled in the art. The foregoing description is intended to be exemplary rather than limiting The scope of the present invention is therefore intended to be limited solely by the scope of the appended claims.

What is claimed is:

1. A circumferential sampling tool for obtaining a sample from an interior wall of a tube comprising:
a cylindrical body having a central axis;
an aperture in the cylindrical body;
a shaft disposed in the cylindrical body along the central axis;
a first cutter operatively connected to the shaft for rotation therewith, the first cutter being movable radially between a retracted position where the first cutter is disposed inside the cylindrical body at a first distance from the central axis and an extended position where the first cutter extends at least in part through the aperture at a second distance from the central axis, the second distance being greater than the first distance;
a first actuator operatively connected to the first cutter for moving the first cutter between the retracted position and the extended position as the shaft rotates, the first actuator mechanically biasing the first cutter toward the retracted position;
a second cutter operatively connected to the shaft for rotation therewith and being disposed at an angle to first cutter, the second cutter being movable radially between a retracted position where the second cutter is disposed inside the cylindrical body at a third distance from the central axis and an extended position where the second cutter extends at least in part through the aperture at a fourth distance from the central axis, the fourth distance being greater than the third distance, the fourth distance being greater than the second distance; and
a second actuator operatively connected to the second cutter for moving the second cutter between the retracted position and the extended position as the shaft rotates, the second actuator mechanically biasing the second cutter toward the retracted position, the second cutter being in the retracted position when the first cutter is in the extended position, and the first cutter being in the retracted position when the second cutter is in the extended position;
wherein rotating the shaft causes the first cutter to move to the extended position thereby cutting a portion of the interior wall of the tube and then causes the second cutter to move to the extended position thereby cutting the sample from the interior wall of the tube from a location in the tube revealed by cutting the portion of the interior wall of the tube.

2. The tool of claim 1, wherein:
the first actuator comprises a spring mechanically biasing the first cutter toward the retracted position; and
the second actuator comprises a spring mechanically biasing the second cutter toward the retracted position.

3. The tool of claim 2, further comprising a ramp disposed inside the cylindrical body along a circumferential portion thereof, the ramp being disposed opposite the aperture;
wherein the first actuator further comprises a first roller, the first roller causing the first cutter to move to the extended position when the first roller rolls over the ramp; and
wherein the second actuator further comprises a second roller, the second roller causing the second cutter to move to the extended position when the second roller rolls over the ramp.

4. The tool of claim 3, wherein a diameter of the first roller is greater than a diameter of the second roller.

5. The tool of claim 1, wherein the first cutter is wider than the second cutter.

6. The tool of claim 1, wherein an arc defined by the first cutter in the extended position as the shaft rotates is longer than an arc defined by the second cutter in the extended position as the shaft rotates.

7. The tool of claim 1, further comprising:
a first receptacle connected to the first cutter for receiving the portion of the interior wall of the tube cut by the first cutter; and
a second receptacle connected to the second cutter for receiving the sample cut by the second cutter.

8. The tool of claim 1, further comprising:
at least one spring connected to the first cutter for biasing the first cutter against the interior wall of the tube when the first cutter is in the extended position; and
at least one spring connected to the second cutter for biasing the second cutter against the interior wall of the tube when the second cutter is in the extended position.

9. The tool of claim 1, wherein the first cutter is disposed opposite the second cutter.

10. The tool of claim 9, further comprising at least one spring connected between the first cutter and the second cutter, the at least one spring biasing the first and second cutters away from each other.

11. The tool of claim 1, further comprising a motor disposed in the cylindrical body and operatively connected to the shaft for rotating the shaft.

12. A circumferential sampling tool for obtaining a sample from an interior wall of a tube comprising:
a cylindrical body having a central axis;
an aperture in the cylindrical body;
a shaft disposed in the cylindrical body along the central axis;
an extension ramp connected to the cylindrical body;
a retraction ramp connected to the cylindrical body;
a first cutter operatively connected to the shaft for rotation therewith, the first cutter being movable radially between a retracted position where the first cutter is disposed inside the cylindrical body at a first distance from the central axis and an extended position where the first cutter extends at least in part through the aperture at a second distance from the central axis, the second distance being greater than the first distance;

a first actuator operatively connected to the first cutter for moving the first cutter between the retracted position and the extended position by interacting with the retraction ramp and the extension ramp respectively as the shaft rotates;

a second cutter operatively connected to the shaft for rotation therewith and being disposed at an angle to first cutter, the second cutter being movable radially between a retracted position where the second cutter is disposed inside the cylindrical body at a third distance from the central axis and an extended position where the second cutter extends at least in part through the aperture at a fourth distance from the central axis, the fourth distance being greater than the third distance, the fourth distance being greater than the second distance; and a second actuator operatively connected to the second cutter for moving the second cutter between the retracted position and the extended position by interacting with the retraction ramp and the extension ramp respectively as the shaft rotates, the second cutter being in the retracted position when the first cutter is in the extended position, and the first cutter being in the retracted position when the second cutter is in the extended position;

wherein rotating the shaft causes the first cutter to move to the extended position thereby cutting a portion of the interior wall of the tube and then causes the second cutter to move to the extended position thereby cutting the sample from the interior wall of the tube from a location in the tube revealed by cutting the portion of the interior wall of the tube.

13. The tool of claim 12, wherein the first actuator includes a first actuation bar disposed generally parallel to the central axis, the first actuation bar having a first roller at a first end thereof, a second roller at a second end thereof, and at least one third roller between the first and second ends thereof;

wherein the second actuator includes a second actuation bar disposed generally parallel to the central axis, the second actuation bar having a fourth roller at a first end thereof, a fifth roller at a second end thereof, and at least one sixth roller between the first and second ends thereof;

wherein the extension ramp extends generally parallel to the central axis toward the first cutter and the second cutter, and defines an arc about the central axis;

wherein the retraction ramp extends generally parallel to the central axis toward the extension ramp, the first cutter and the second cutter, and defines an arc about the central axis;

wherein the first and second cutters are disposed between the extension ramp and the retraction ramp in a direction parallel to the central axis;

the tool further comprising:
a first holder connected to the first cutter, the first holder having at least one slot defined therein at an angle to the central axis, the at least one slot of the first holder receiving the at least one third roller therein; and a second holder connected to the second cutter, the second holder having at least one slot defined therein at an angle to the central axis, the at least one slot of the second holder receiving the at least one sixth roller therein;

wherein when the first roller rolls over the extension ramp, the at least one third roller moves in the at least one slot of the first holder causing the first holder to move radially away from the central axis thereby causing the first cutter to move to the extended position;

wherein when the second roller rolls over the retraction ramp, the at least one third roller moves in the at least one slot of the first holder causing the first holder to move radially toward the central axis thereby causing the first cutter to move to the retracted position;

wherein when the fourth roller rolls over the extension ramp, the at least one sixth roller moves in the at least one slot of the second holder causing the second holder to move radially away from the central axis thereby causing the second cutter to move to the extended position; and wherein when the fifth roller rolls over the retraction ramp, the at least one sixth roller moves in the at least one slot of the second holder causing the second holder to move radially toward the central axis thereby causing the second cutter to move to the retracted position.

14. The tool of claim 13, wherein the extension ramp has a first ramp portion and a second ramp portion, the first ramp portion being longer than the second ramp portion; and wherein the first roller rolls over the first ramp portion of the extension ramp and the fourth roller rolls over the second ramp portion of the extension ramp.

15. The tool of claim 13, wherein the retraction ramp has a first ramp portion and a second ramp portion, the first ramp portion being longer than the second ramp portion; and wherein the second roller rolls over the second ramp portion of the retraction ramp and the fifth roller rolls over the first ramp portion of the retraction ramp.

16. The tool of claim 12, wherein the first cutter is wider than the second cutter.

17. The tool of claim 12, wherein an arc defined by the first cutter in the extended position as the shaft rotates is longer than an arc defined by the second cutter in the extended position as the shaft rotates.

18. The tool of claim 12, further comprising:
a first receptacle connected to the first cutter for receiving the portion of the interior wall of the tube cut by the first cutter; and
a second receptacle connected to the second cutter for receiving the sample cut by the second cutter.

19. The tool of claim 12, further comprising:
at least one spring connected to the first cutter for biasing the first cutter against the interior wall of the tube when the first cutter is in the extended position; and
at least one spring connected to the second cutter for biasing the second cutter against the interior wall of the tube when the second cutter is in the extended position.

20. The tool of claim 12, further comprising a motor disposed in the cylindrical body and operatively connected to the shaft for rotating the shaft.

* * * * *